(12) United States Patent
Gorrell et al.

(10) Patent No.: US 7,443,577 B2
(45) Date of Patent: Oct. 28, 2008

(54) REFLECTING FILTERING COVER

(75) Inventors: Jonathan Gorrell, Gainesville, FL (US); Mark Davidson, Florahome, FL (US)

(73) Assignee: Virgin Islands Microsystems, Inc., Saint Thomas, VI (US)

(*) Notice: Subject to any disclaimer, the term of this patent is extended or adjusted under 35 U.S.C. 154(b) by 0 days.

(21) Appl. No.: 11/418,087

(22) Filed: May 5, 2006

(65) Prior Publication Data
US 2007/0258146 A1 Nov. 8, 2007

(51) Int. Cl.
*F21V 9/04* (2006.01)
(52) U.S. Cl. ............... 359/359; 977/950; 250/503.1
(58) Field of Classification Search ............... None
See application file for complete search history.

(56) References Cited

U.S. PATENT DOCUMENTS

| | | | |
|---|---|---|---|
| 1,948,384 A | 2/1934 | Lawrence | |
| 2,307,086 A | 1/1943 | Varian et al. | |
| 2,431,396 A | 11/1947 | Hansell | |
| 2,473,477 A | 6/1949 | Smith | |
| 2,634,372 A | 4/1953 | Salisbury | |
| 2,932,798 A | 4/1960 | Kerst et al. | |
| 3,571,642 A | 3/1971 | Westcott | |
| 3,586,899 A * | 6/1971 | Fleisher | 315/4 |
| 3,761,828 A | 9/1973 | Pollard et al. | |
| 3,923,568 A | 12/1975 | Bersin | |
| 3,989,347 A | 11/1976 | Eschler | |
| 4,282,436 A | 8/1981 | Kapetanakos | |
| 4,482,779 A | 11/1984 | Anderson | |
| 4,727,550 A * | 2/1988 | Chang et al. | 372/2 |
| 4,740,973 A | 4/1988 | Madey | |
| 4,746,201 A | 5/1988 | Gould | |
| 4,829,527 A | 5/1989 | Wortman et al. | |
| 4,838,021 A | 6/1989 | Beattie | |
| 5,023,563 A | 6/1991 | Harvey et al. | |
| 5,157,000 A | 10/1992 | Elkind et al. | |
| 5,163,118 A | 11/1992 | Lorenzo et al. | |
| 5,185,073 A | 2/1993 | Bindra | |
| 5,199,918 A | 4/1993 | Kumar | |
| 5,262,656 A | 11/1993 | Blondeau et al. | |
| 5,263,043 A | 11/1993 | Walsh | |
| 5,268,693 A | 12/1993 | Walsh | |

(Continued)

FOREIGN PATENT DOCUMENTS

EP 0237559 B1 12/1991

(Continued)

OTHER PUBLICATIONS

J. C. Palais, 'Fiber optic communications', Prentice Hall, New Jersey, 1998, pp. 156-158.*

(Continued)

*Primary Examiner*—Arnel C Lavarias
(74) *Attorney, Agent, or Firm*—Davidson Berquist Jackson & Gowdey LLP

(57) ABSTRACT

A filter for use with an array of ultra-small resonant structures that are producing encoded EMR wherein the filter is designed to either reflect encoded EMR beams or to permit certain frequencies to pass there through so that the encoded EMR beam and its encoded data can be transmitted out of the device and to another receiver where the data can be used.

11 Claims, 1 Drawing Sheet

U.S. PATENT DOCUMENTS

| | | | |
|---|---|---|---|
| 5,268,788 A * | 12/1993 | Fox et al. ............... | 359/490 |
| 5,302,240 A | 4/1994 | Hori et al. | |
| 5,354,709 A | 10/1994 | Lorenzo et al. | |
| 5,446,814 A | 8/1995 | Kuo et al. | |
| 5,608,263 A | 3/1997 | Drayton et al. | |
| 5,668,368 A | 9/1997 | Sakai et al. | |
| 5,705,443 A | 1/1998 | Stauf et al. | |
| 5,737,458 A | 4/1998 | Wojnarowski et al. | |
| 5,744,919 A | 4/1998 | Mishin et al. | |
| 5,757,009 A | 5/1998 | Walstrom | |
| 5,767,013 A | 6/1998 | Park | |
| 5,790,585 A | 8/1998 | Walsh | |
| 5,811,943 A | 9/1998 | Mishin et al. | |
| 5,821,836 A | 10/1998 | Katehi et al. | |
| 5,821,902 A | 10/1998 | Keen | |
| 5,831,270 A | 11/1998 | Nakasuji | |
| 5,847,745 A | 12/1998 | Shimizu et al. | |
| 5,889,449 A | 3/1999 | Fiedziuszko | |
| 5,902,489 A | 5/1999 | Yasuda et al. | |
| 6,008,496 A | 12/1999 | Winefordner et al. | |
| 6,040,625 A | 3/2000 | Ip | |
| 6,060,833 A | 5/2000 | Velazco | |
| 6,080,529 A | 6/2000 | Ye et al. | |
| 6,195,199 B1 | 2/2001 | Yamada | |
| 6,222,866 B1 | 4/2001 | Seko | |
| 6,281,769 B1 | 8/2001 | Fiedziuszko | |
| 6,297,511 B1 | 10/2001 | Syllaios et al. | |
| 6,338,968 B1 | 1/2002 | Hefti | |
| 6,370,306 B1 | 4/2002 | Sato et al. | |
| 6,373,194 B1 | 4/2002 | Small | |
| 6,376,258 B2 | 4/2002 | Hefti | |
| 6,407,516 B1 | 6/2002 | Victor | |
| 6,441,298 B1 | 8/2002 | Thio | |
| 6,504,303 B2 | 1/2003 | Small | |
| 6,545,425 B2 | 4/2003 | Victor | |
| 6,577,040 B2 | 6/2003 | Nguyen | |
| 6,603,915 B2 | 8/2003 | Glebov et al. | |
| 6,624,916 B1 | 9/2003 | Green et al. | |
| 6,636,653 B2 | 10/2003 | Miracky et al. | |
| 6,642,907 B2 | 11/2003 | Hamada et al. | |
| 6,738,176 B2 | 5/2004 | Rabinowitz et al. | |
| 6,741,781 B2 | 5/2004 | Furuyama | |
| 6,782,205 B2 | 8/2004 | Trisnadi et al. | |
| 6,791,438 B2 | 9/2004 | Takahashi et al. | |
| 6,829,286 B1 | 12/2004 | Guilfoyle et al. | |
| 6,834,152 B2 | 12/2004 | Gunn et al. | |
| 6,870,438 B1 | 3/2005 | Shino et al. | |
| 6,885,262 B2 | 4/2005 | Nishimura et al. | |
| 6,909,092 B2 | 6/2005 | Nagahama | |
| 6,909,104 B1 * | 6/2005 | Koops et al. ............ | 250/493.1 |
| 6,944,369 B2 | 9/2005 | Deliwala | |
| 6,953,291 B2 | 10/2005 | Liu | |
| 6,965,625 B2 | 11/2005 | Mross et al. | |
| 6,995,406 B2 | 2/2006 | Tojo et al. | |
| 7,010,183 B2 | 3/2006 | Estes et al. | |
| 7,092,588 B2 | 8/2006 | Kondo | |
| 7,092,603 B2 | 8/2006 | Glebov et al. | |
| 7,122,978 B2 | 10/2006 | Nakanishi et al. | |
| 7,177,515 B2 | 2/2007 | Estes et al. | |
| 7,267,459 B2 | 9/2007 | Matheson | |
| 7,267,461 B2 | 9/2007 | Kan et al. | |
| 2001/0025925 A1 | 10/2001 | Abe et al. | |
| 2002/0009723 A1 | 1/2002 | Hefti | |
| 2002/0027481 A1 | 3/2002 | Fiedziuszko | |
| 2002/0036264 A1 | 3/2002 | Nakasuji et al. | |
| 2002/0053638 A1 | 5/2002 | Winkler et al. | |
| 2002/0135665 A1 | 9/2002 | Gardner | |
| 2003/0012925 A1 | 1/2003 | Gorrell | |
| 2003/0016412 A1 | 1/2003 | Small | |
| 2003/0016421 A1 | 1/2003 | Small | |
| 2003/0034535 A1 | 2/2003 | Barenburu et al. | |
| 2003/0155521 A1 | 8/2003 | Feuerbaum | |
| 2003/0164947 A1 | 9/2003 | Vaupel | |
| 2003/0179974 A1 | 9/2003 | Estes et al. | |
| 2003/0206708 A1 | 11/2003 | Estes et al. | |
| 2003/0214695 A1 | 11/2003 | Abramson et al. | |
| 2004/0061053 A1 | 4/2004 | Taniguchi et al. | |
| 2004/0108473 A1 | 6/2004 | Melnychuk et al. | |
| 2004/0136715 A1 | 7/2004 | Kondo | |
| 2004/0150991 A1 * | 8/2004 | Ouderkirk et al. ......... | 362/231 |
| 2004/0171272 A1 | 9/2004 | Jin et al. | |
| 2004/0180244 A1 | 9/2004 | Tour et al. | |
| 2004/0213375 A1 | 10/2004 | Bjorkholm et al. | |
| 2004/0217297 A1 | 11/2004 | Moses et al. | |
| 2004/0231996 A1 | 11/2004 | Webb | |
| 2004/0240035 A1 | 12/2004 | Zhilkov | |
| 2004/0264867 A1 | 12/2004 | Kondo | |
| 2005/0023145 A1 | 2/2005 | Cohen et al. | |
| 2005/0045821 A1 | 3/2005 | Noji et al. | |
| 2005/0054151 A1 | 3/2005 | Lowther et al. | |
| 2005/0067286 A1 | 3/2005 | Ahn et al. | |
| 2005/0082469 A1 | 4/2005 | Carlo | |
| 2005/0092929 A1 | 5/2005 | Schneiker | |
| 2005/0105690 A1 | 5/2005 | Pau et al. | |
| 2005/0145882 A1 | 7/2005 | Taylor et al. | |
| 2005/0162104 A1 | 7/2005 | Victor et al. | |
| 2005/0190637 A1 | 9/2005 | Ichimura et al. | |
| 2005/0194258 A1 | 9/2005 | Cohen et al. | |
| 2005/0201707 A1 | 9/2005 | Glebov et al. | |
| 2005/0201717 A1 | 9/2005 | Matsumura et al. | |
| 2005/0212503 A1 | 9/2005 | Deibele | |
| 2005/0249451 A1 | 11/2005 | Baehr-Jones et al. | |
| 2006/0007730 A1 | 1/2006 | Nakamura et al. | |
| 2006/0018619 A1 | 1/2006 | Helffrich et al. | |
| 2006/0035173 A1 | 2/2006 | Davidson et al. | |
| 2006/0045418 A1 | 3/2006 | Cho et al. | |
| 2006/0060782 A1 | 3/2006 | Khursheed | |
| 2006/0062258 A1 | 3/2006 | Brau et al. | |
| 2006/0159131 A1 | 7/2006 | Liu et al. | |
| 2006/0164496 A1 | 7/2006 | Tokutake et al. | |
| 2006/0216940 A1 | 9/2006 | Gorrell et al. | |
| 2006/0274922 A1 | 12/2006 | Ragsdale | |
| 2007/0003781 A1 | 1/2007 | de Rochemont | |
| 2007/0013765 A1 | 1/2007 | Hudson et al. | |
| 2007/0075264 A1 | 4/2007 | Gorrell et al. | |
| 2007/0086915 A1 | 4/2007 | LeBoeuf et al. | |
| 2007/0116420 A1 | 5/2007 | Estes et al. | |

FOREIGN PATENT DOCUMENTS

| | | | |
|---|---|---|---|
| JP | 2004032323 A * | 1/2004 | |
| WO | WO 87/01873 | 3/1987 | |
| WO | WO 93/21663 A1 | 10/1993 | |
| WO | WO 00/72413 | 11/2000 | |
| WO | WO 02/025785 | 3/2002 | |
| WO | WO 02/077607 | 10/2002 | |
| WO | WO 2004/086560 | 10/2004 | |
| WO | WO 2005/015143 A2 | 2/2005 | |
| WO | WO 2006/042239 A2 | 4/2006 | |
| WO | WO 2007/081389 | 7/2007 | |
| WO | WO 2007/081390 | 7/2007 | |
| WO | WO 2007/081391 | 7/2007 | |

OTHER PUBLICATIONS

"Array of Nanoklystrons for Frequency Agility or Redundancy," NASA's Jet Propulsion Laboratory, NASA Tech Briefs, NPO-21003. 2001.

"Hardware Development Programs," Calabazas Creek Research, Inc. found at http://calcreek.com/hardware.html.

"Antenna Arrays." May 18, 2002. www.tpub.com/content/neets/14183/css/14183_159.htm.

"Diffraction Grating," hyperphysics.phy-astr.gsu.edu/hbase/phyopt/grating.html.

Alford, T.L. et al., "Advanced silver-based metallization patterning for ULSI applications," Microelectronic Engineering 55, 2001, pp. 383-388, Elsevier Science B.V.

Amato, Ivan, "An Everyman's Free-Electron Laser?" Science, New Series, Oct. 16, 1992, p. 401, vol. 258 No. 5081, American Association for the Advancement of Science.

Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.

Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.

Bakhtyari, A. et al., "Horn Resonator Boosts Miniature Free-Electron Laser Power," Applied Physics Letters, May 12, 2003, pp. 3150-3152, vol. 82, No. 19, American Institute of Physics.

Bakhtyari, Dr. Arash, "Gain Mechanism in a Smith-Purcell MicroFEL," Abstract, Department of Physics and Astronomy, Dartmouth College.

Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.

Booske, J.H. et al., "Microfabricated TWTs as High Power, Wideband Sources of THz Radiation".

Brau, C.A. et al., "Gain and Coherent Radiation from a Smith-Purcell Free Electron Laser," Proceedings of the 2004 FEL Conference, pp. 278-281.

Brownell, J.H. et al., "Improved μFEL Performance with Novel Resonator," Jan. 7, 2005, from website: www.frascati.enea.it/thz-bridge/workshop/presentations/Wednesday/We-07-Brownell.ppt.

Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.

Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.

Chuang, S.L. et al., "Smith-Purcell Radiation from a Charge Moving Above a Penetrable Grating," IEEE MTT-S Digest, 1983, pp. 405-406, IEEE.

Far-IR, Sub-MM & MM Detector Technology Workshop list of manuscripts, session 6 2002.

Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.

Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review, E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron".

Manohara, Harish M. et al., "Design and Fabrication of a THz Nanoklystron" (www.sofia.usra.edu/det_workshop/ posters/session 3/3-43manohara_poster.pdf), PowerPoint Presentation.

McDaniel, James C. et al., "Smith-Purcell Radiation in the High Conductivity and Plasma Frequency Limits," Applied Optics, Nov. 15, 1989, pp. 4924-4929, vol. 28, No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17 (5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Phototonics Research, "Surface-Plasmon-Enhanced Random Laser Demonstrated," Phototonics Spectra, Feb. 2005, pp. 112-113.

Platt, C.L. et al., "A New Resonator Design for Smith-Purcell Free Electron Lasers," 6Q19, p. 296.

Search Report and Written Opinion mailed Mar. 7, 2007 in corresponding PCT Appln. No. PCT/US2006/022775.

Speller et al., "A Low-Noise MEMS Accelerometer for Unattended Ground Sensor Applications", Applied MEMS Inc., 12200 Parc Crest, Stafford, TX, USA 77477.

Thurn-Albrecht et al., "Ultrahigh-Density Nanowire Arrays Grown in Self-Assembled Diblock Copolymer Templates", Science 290. 5499, Dec. 15, 2000, pp. 2126-2129.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Jul. 16, 2007 in PCT Appln. No. PCT/US2006/022774.

Search Report and Written Opinion mailed Jul. 20, 2007 in PCT Appln. No. PCT/US2006/024216.

Search Report and Written Opinion mailed Jul. 26, 2007 in PCT Appln. No. PCT/US2006/022776.

Search Report and Written Opinion mailed Jun. 20, 2007 in PCT Appln. No. PCT/US2006/022779.

Search Report and Written Opinion mailed Sep. 12, 2007 in PCT Appln. No. PCT/US2006/022767.

Search Report and Written Opinion mailed Sep. 13, 2007 in PCT Appln. No. PCT/US2006/024217.

Search Report and Written Opinion mailed Sep. 17, 2007 in PCT Appln. No. PCT/US2006/022787.

Search Report and Written Opinion mailed Sep. 21, 2007 in PCT Appln. No. PCT/US2006/022688.

Search Report and Written Opinion mailed Sep. 25, 2007 in PCT appln. No. PCT/US2006/022681.

Search Report and Written Opinion mailed Sep. 26, 2007 in PCT Appln. No. PCT/US2006/024218.

Search Report and Written Opinion mailed Sep. 5, 2007 in PCT Appln. No. PCT/US2006/027428.

Search Report and Written Opinion mailed Sep. 17, 2007 in PCT Appln. No. PCT/US2006/022689.

Search Report and Written Opinion mailed Dec. 20, 2007 in PCT Appln. No. PCT/US2006/022771.

Search Report and Written Opinion mailed Jan. 31, 2008 in PCT Appln. No. PCT/US2006/027427.

Search Report and Written Opinion mailed Jan. 8, 2008 in PCT Appln. No. PCT/US2006/028741.

Search Report and Written Opinion mailed Mar. 11, 2008 in PCT Appln. No. PCT/US2006/022679.

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in corresponding PCT Appln. No. PCT/US2006/022682.
Search Report and Written Opinion mailed Feb. 20, 2007 in corresponding PCT Appln. No. PCT/US2006/022676.
Search Report and Written Opinion mailed Feb. 20, 2007 in corresponding PCT Appln. No. PCT/US2006/022772.
Search Report and Written Opinion mailed Feb. 20, 2007 in corresponding PCT Appln. No. PCT/US2006/022780.
Search Report and Written Opinion mailed Feb. 21, 2007 in corresponding PCT Appln. No. PCT/US2006/022684.
Search Report and Written Opinion mailed Jan. 17, 2007 in corresponding PCT Appln. No. PCT/US2006/022777.
Search Report and Written Opinion mailed Jan. 23, 2007 in corresponding PCT Appln. No. PCT/US2006/022781.
Search Report and Written Opinion mailed Mar. 7, 2007 in corresponding PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477, 2004.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
"Hardware Development Programs," Calabazas Creek Research, Inc. found at http://calcreek.com/hardware.html, 2003.
"Diffraction Grating," hyperphysics.phy-astr.gsu.edu/hbase/phyopt/grating.html, 2005.
Bakhtyari, Dr. Arash, "Gain Mechanism in a Smith-Purcell MicroFEL," Abstract, Department of Physics and Astronomy, Dartmouth College., 2002.
Booske, J.H. et al., "Microfabricated TWTs as High Power, Wideband Sources of THz Radiation", 2001.
Gallerano, G.P. et al., "Overview of Terahertz Radiation Sources," Proceedings of the 2004 FEL Conference, pp. 216-221.
Goldstein, M. et al. ,"Demonstration of a Micro Far-Infrared Smith-Purcell Emitter," Applied Physics Letters, Jul. 28, 1997, pp. 452-454. vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.
Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.
Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.
Ives, Lawrence et al., "Development of Backward Wave Oscillators for Terahertz Applications," Terahertz for Military and Security Applications, Proceedings of SPIE vol. 5070 (2003), pp. 71-82.
Ives, R. Lawrence, "IVEC Summary, Session 2, Sources I" 2002.
Jonietz Erika, "Nano Antenna Gold nanospheres show path to all-optical computing," Technology Review, Dec. 2005/Jan. 2006, p. 32.
Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.
Korbly, S.E. et al., "Progress on a Smith-Purcell Radiation Bunch Length Diagnostic," Plasma Science and Fusion Center, MIT, Cambridge, MA, 2003.
Kormann, T. et al., "A Photoelectron Source for the Study of Smith-Purcell Radiation", 1996.
Manohara, Harish M. et al., "Design and Fabrication of a THz Nanoklystron" 2004.
Manohara, Harish M. et al., "Design and Fabrication of a THz Nanoklystron" (www.sofia.usra.edu/det_workshop/ posters/session 3/3-43manohara_poster.pdf), PowerPoint Presentation, 2004.
Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan., 2001.
Platt, C.L. et al., "A New Resonator Design for Smith-Purcell Free Electron Lasers," 6Q19, p. 296. 1997.
Potylitsin, A.P., "Resonant Diffraction Radiation and Smith-Purcell Effect," (Abstract), arXiv: physics/9803043 v2 Apr. 13, 1998.
Potylitsyn, A.P., "Resonant Diffraction Radiation and Smith-Purcell Effect," Physics Letters A, Feb. 2, 1998, pp. 112-116, A 238, Elsevier Science B.V.
S. Hoogland et al., "A solution-processed 1.53 μm quantum dot laser with temperature-invariant emission wavelength," Optics Express, vol. 14, No. 8, Apr. 17, 2006, pp. 3273-3281.
Savilov, Andrey V., "Stimulated Wave Scattering in the Smith-Purcell FEL," IEEE Transactions on Plasma Science, Oct. 2001, pp. 820-823, vol. 29 No. 5, IEEE.
Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.
Schachter, Levi, "Influence of the Guilding Magnetic Field on the Performance of a Smith-Purcell Amplifier Operating in the Weak Compton Regime," Journal of the Optical Society of America, May 1990, pp. 873-876, vol. 7 No. 5, Optical Society of America.
Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.
Shih, I. et al., "Experimental Investigations of Smith-Purcell Radiation," Journal of the Optical Society of America, Mar. 1990, pp. 351-356, vol. 7, No. 3, Optical Society of America.
Shih, I. et al., "Measurements of Smith-Purcell Radiation," Journal of the Optical Society of America, Mar. 1990, pp. 345-350, vol. 7 No. 3, Optical Society of America.
Swartz, J.C. et al., "THz-FIR Grating Coupled Radiation Source," Plasma Science, 1998. 1D02, p. 126.
Temkin, Richard, "Scanning with Ease Through the Far Infrared," Science, New Series, May 8, 1998, p. 854, vol. 280, No. 5365, American Association for the Advancement of Science.
Walsh, J.E., et al., 1999. From website: http://www.ieee.org/organizations/pubs/newsletters/leos/feb99/hot2.htm.
Wentworth, Stuart M. et al., "Far-Infrared Composite Microbolometers," IEEE MTT-S Digest, 1990, pp. 1309-1310.
Yamamoto, N. et al., "Photon Emission From Silver Particles Induced by a High-Energy Electron Beam," Physical Review B, Nov. 6, 2001, pp. 205419-1-205419-9, vol. 64, The American Physical Society.
Yokoo, K. et al., "Smith-Purcell Radiation at Optical Wavelength Using a Field-Emitter Array," Technical Digest of IVMC, 2003, pp. 77-78.
Zeng, Yuxiao et al., "Processing and encapsulation of silver patterns by using reactive ion etch and ammonia anneal," Materials Chemistry and Physics 66, 2000, pp. 77-82.
International Search Report and Written Opinion mailed Nov. 23, 2007 in International Application No. PCT/US2006/022786.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.

* cited by examiner

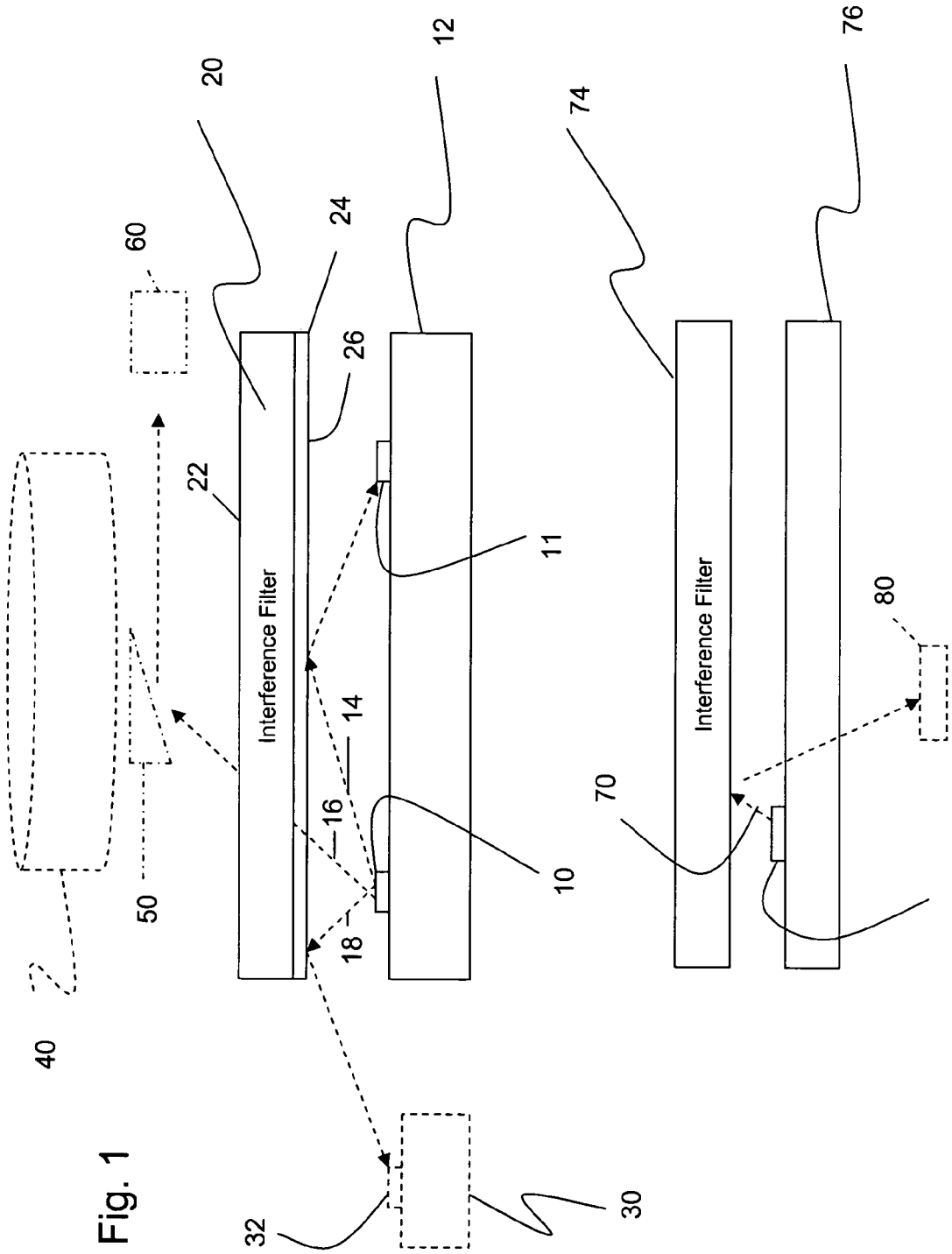

REFLECTING FILTERING COVER

CROSS-REFERENCE TO RELATED APPLICATIONS

The present invention is related to the following co-pending U.S. patent applications which are all commonly owned with the present application, the entire contents of each of which are incorporated herein by reference:
1. U.S. patent application Ser. No. 11/238,991, entitled "Ultra-Small Resonating Charged Particle Beam Modulator," filed Sep. 30, 2005;
2. U.S. patent application Ser. No. 10/917,511, entitled "Patterning Thin Metal Film by Dry Reactive Ion Etching," filed on Aug. 13, 2004;
3. U.S. application Ser. No. 11/203,407, entitled "Method Of Patterning Ultra-Small Structures," filed on Aug. 15, 2005;
4. U.S. application Ser. No. 11/243,476, entitled "Structures And Methods For Coupling Energy From An Electromagnetic Wave," filed on Oct. 5, 2005;
5. U.S. application Ser. No. 11/243,477, entitled "Electron beam induced resonance," filed on Oct. 5, 2005;
6. U.S. application Ser. No. 11/325,448, entitled "Selectable Frequency Light Emitter from Single Metal Layer," filed Jan. 5, 2006;
7. U.S. application Ser. No. 11/325,432, entitled, "Matrix Array Display," filed Jan. 5, 2006;
8. U.S. application Ser. No. 11/302,471, entitled "Coupled Nano-Resonating Energy Emitting Structures," filed Dec. 14, 2005;
9. U.S. application Ser. No. 11/325,571, entitled "Switching Micro-resonant Structures by Modulating a Beam of Charged Particles," filed Jan. 5, 2006;
10. U.S. application Ser. No. 11/325,534, entitled "Switching Microresonant Structures Using at Least One Director," filed Jan. 5, 2006;
11. U.S. application Ser. No. 11/350,812, entitled "Conductive Polymers for Electroplating," filed Feb. 10, 2006;
12. U.S. application Ser. No. 11/349,963, entitled "Method and Structure for Coupling Two Microcircuits," filed Feb. 9, 2006;
13. U.S. application Ser. No. 11/353,208, entitled "Electron Beam Induced Resonance," filed Feb. 14, 2006; and
14. U.S. Application No. 11/418,079, entitled "Novel Optical Cover For Optical Chip," filed on even date herewith.

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This relates in general to use of filtering covers for use with beams of encoded light or other forms of encoded EMR emitting structures, collectively referenced herein as encoded EMR, and specifically to covers or designed to reflect certain frequencies while permitting other frequencies to pass through the filter and directed to a receiver so that the data can be transmitted and used.

INTRODUCTION

It is not a simple task to modulate a light beam into an electron beam. Due to the size and dispersion of photons in the light beam and the size and dispersion of electrons in the electron beam the two rarely intersect, physically, even when the light beam and electron beam are directly crossed. There have been some physicists who have employed large scale lasers to intersect an electron beam and detected occasional scattered electron patterns caused by a few of the electrons in the beam physically intersecting with photons in the laser beam. But, the scale of such devices is large and their efficiency is poor.

In the related applications described above, micro- and nano-resonant structures are described that react in now-predictable manners when an electron beam is passed in their proximity. We have seen, for example, that the very small structures described in those applications allow energy of the electron beam to be converted into the energy of electromagnetic radiation (light) when the electron beam passes nearby. When the electron beam passes near the structure, it excites synchronized oscillations of the electrons in the structure (surface plasmons). As often repeated as the many electrons in a beam pass, these surface plasmons result in reemission of detectable photons as electromagnetic radiation (EMR).

The EMR can be modulated to encode data from a data source. The encoded EMR can then transport the data at an extremely fast data rate. Further, using resonant structures of the types described in the related applications, the transmitter can be built into a chip and used to transmit the data within a microcircuit (intra-chip) or between one or more microcircuits of one or more chips. A number of methods of encoding such data can be envisioned and is not delimiting of the inventions described herein.

We herein disclose methods and structures for sending and receiving the encoded EMR so that the data in the encoded EMR can be used at the receiving end.

BRIEF DESCRIPTION OF THE DRAWINGS

FIG. 1 is a schematic view of a first embodiment of the present invention; and

FIG. 2 is another embodiment of the present invention.

THE PRESENTLY PREFERRED EXEMPLARY EMBODIMENTS

With reference to FIG. 1, a transmitter 10 can include an ultra-small resonant structure, such as any one described in U.S. patent application Ser. Nos. 11/238,991; 11/243,476; 11/243,477; 11/325,448; 11/325,432; 11/302,471; 11/325,571; 11/325,534; 11/349,963; and/or 11/353,208 (each of which is identified more particularly above). The resonant structures comprising the transmitter can be manufactured in accordance with any of U.S. application Ser. Nos. 10/917,511; 11/350,812; or 11/203,407 (each of which is identified more particularly above) or in other ways. Their sizes and dimensions can be selected in accordance with the principles described in those applications and, for the sake of brevity, will not be repeated herein. The contents of the applications described above are assumed to be known to the reader.

Although less advantageous than the ultra-small resonant structures identified in the applications described above, alternatively the transmitter 10 can also comprise any macroscopic or microscopic light emitter, and can include even prior art LEDs, semiconductors or other light-emitting devices. As the term is used herein, the structures are considered ultra-small when they embody at least one dimension that is smaller than the wavelength of visible light. The ultra-small structures are also employed in a vacuum environment. Methods of evacuating the environment where the exciting and emitted encoded EMR beams move can be selected from known evacuation methods.

The transmitter 10 is mounted to a substrate 12, is operated in association with a data source (not shown but has been described in one or more of the above referenced applications and will not be repeated herein), which may be part of the transmitter or may be separated from the transmitter. For purposes of this disclosure, the kind of data transmitted, the kind of EMR produced, and the kind of structure producing the EMR are not delimiting. It matters only that in some way data are encoded into an encoded EMR beam, and for purposes of illustrating the present invention several encoded EMR beams are referenced at 14, 16 and 18.

With reference to FIG. 1, beam 14 can be deflected upwardly at an angle, for example by a suitable reflector (not shown), to intersect the bottom surface 26 of an interference filter 20, comprised of a first layer 22 formed from, for example, of a plurality of various oxide layers, including Ti, Al, Hf, or alternatively other materials with varying indices of refraction. As an option, filter 20 may also include a second layer 24 formed of, for example, of an absorptive material such as, CdSe, that would also be either transparent or translucent. It should be understood that interference filters are well known and the art recognizes how they are constructed and designed to control the reflection of or passage there through of selected frequencies. Consequently, further details concerning interference filters are not needed for one skilled in the art to understand the present invention. In the example as shown in FIG. 1, as beam 14 intersects the bottom surface 26 of interference filter 20 the frequency of beam 14 will be such that it is reflected back down to a receiver 11 on the same substrate 12 where the encoded data can be used.

Beam 18 is shown as being deflected in a direction about opposite to that of beam 14 so that beam 18 is transmitted out of the environment of substrate 12 to another device shown in phantom at 30, and specifically to a receiver 32 thereon.

Beam 16 has a frequency which the filter 20 will allow to pass there through so that the encoded EMR beam 16 can be transmitted upwardly through filter 20 to, for example, an optical device 40 mounted above the interference filter 20, or other receiver mounted outside the chip or the device comprising substrate 12, which can receive and use the encoded data on beam 16. Alternatively, beam 16 can be deflected or reflected once it is beyond the bounds of interference filter 20, as for example by a reflector 50, that can be formed on the bottom of a device mounted above filter 20 or on another structure mounted there above, or by a magnetic or electronic deflector that could be properly mounted above filter 20 and charged to deflect the beam 16 as desired. Such deflectors are described in one or more of the related applications noted above so that further discussion is not needed herein. All that is required is that beam 16 be moved enough so as to be aimed as desired at another device or receiver, generally shown at 60, where it and the encoded data thereon can be used.

It should also be understood that while the beams 14, 16 and 18 have been shown as comprising out going beams of encoded EMR, these beams could also represent incoming beams of encoded EMR or incoming EMR beams.

With reference to FIG. 2 an encoded EMR beam 70 emitted or produced by a transmitter 72, comprised of ultra-small resonant structures or other energy emitting device, will be reflected by interference filter 74 and the substrate 76 is comprised of a transparent or translucent material, such as, for example borosilicate glass, that permits the reflected beam 70 to pass there through and beyond substrate 76 to a receiver 80 mounted there below. Here again, beam 70 could also be an incoming encoded EMR beam so that the data encoded thereon could be used on devices on substrate 76, for example should 72 be a receiver instead of a transmitter. As an example, where the substrate is comprised of silicon encoded EMR in the infer red frequency will pass there through.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter for use with chips on which encoded electromagnetic radiation (EMR) is being produced by at least one ultra-small resonant structure mounted on the chip comprising: a substrate, an ultra-small resonant structure transmitter mounted to the substrate, the ultra small resonant structure emitting encoded EMR when a charged partical beam passes thereby but does not touch the ultra small resonant structure and a cover mounted there above, wherein the cover is formed to reflect a first set of selected frequencies of the encoded EMR and to permit a second set of selected frequencies to pass there through.

2. The filter as in claim 1 wherein the reflected EMR beams are used in an intra-chip manner.

3. The filter as in claim 1 wherein the reflected EMR beams are used in an inter-chip manner.

4. The filter as in claim 1 wherein the reflected EMR beams are directed to an inter-chip receiver.

5. The filter as in claim 1 wherein the encoded EMR beams pass through the filter and are directed to a receiver located beyond the boundary of the chip.

6. The filter as in claim 5 wherein the beam is received by an optical receiver.

7. The filter as in claim 1 wherein the encoded EMR beam is reflected and thereafter passes to an inter-chip receiver.

8. The filter as in claim 1 wherein the first set of frequencies includes visible light.

9. The filter as in claim 1 wherein the second set of frequencies includes infra red light.

10. The filter as in claim 1 wherein the encoded EMR beam is reflected and thereafter passes through the substrate to an inter-chip receiver.

11. Apparatus comprising:
   a substrate;
   an ultra-small resonant structure transmitter formed on the substrate emitting encoded electromagnetic radiation (EMR) when a charged partical beam passes thereby but does not touch the ultra small resonant structure; and
   a filter cover mounted above the transmitter,
   wherein the filter cover is formed to reflect a first set of selected frequencies of the encoded EMR and to permit a second set of selected frequencies to pass there through.

* * * * *